United States Patent
Russell et al.

(10) Patent No.: US 9,480,011 B2
(45) Date of Patent: Oct. 25, 2016

(54) VOICE OVER INTERNET PROTOCOL PROVISION

(75) Inventors: Nick Russell, Newbury (GB); Christopher David Pudney, Newbury (GB); Gavin Wong, Newbury (GB)

(73) Assignee: Vodafone Group PLC, Berkshire (GB)

( * ) Notice: Subject to any disclaimer, the term of this patent is extended or adjusted under 35 U.S.C. 154(b) by 0 days.

(21) Appl. No.: 12/928,162

(22) Filed: Dec. 3, 2010

(65) Prior Publication Data

US 2011/0134838 A1 Jun. 9, 2011

(30) Foreign Application Priority Data

Dec. 3, 2009 (GB) .................................. 0921219.2

(51) Int. Cl.
| | |
|---|---|
| *H04W 40/00* | (2009.01) |
| *H04W 48/18* | (2009.01) |
| *H04W 76/02* | (2009.01) |
| *H04L 29/06* | (2006.01) |

(52) U.S. Cl.
CPC .......... *H04W 48/18* (2013.01); *H04L 65/1016* (2013.01); *H04W 76/026* (2013.01)

(58) Field of Classification Search
CPC ............ H04L 65/1016; H04W 48/18; H04W 76/026
USPC ........ 370/208, 259, 351–358, 331–334, 310, 370/322, 384, 385, 395, 328–329
See application file for complete search history.

(56) References Cited

U.S. PATENT DOCUMENTS

| | | | |
|---|---|---|---|
| 7,881,288 B2* | 2/2011 | Noldus et al. ................ 370/354 |
| 2006/0084431 A1* | 4/2006 | Hua et al. ..................... 455/433 |
| 2006/0105766 A1* | 5/2006 | Azada et al. ............... 455/432.1 |
| 2007/0091879 A1* | 4/2007 | Croak et al. .................. 370/356 |
| 2009/0003276 A1* | 1/2009 | Mutikainen et al. ......... 370/329 |
| 2009/0268667 A1* | 10/2009 | Gandham et al. ........... 370/328 |
| 2009/0270099 A1* | 10/2009 | Gallagher et al. ......... 455/435.1 |
| 2011/0013597 A1* | 1/2011 | Hwang et al. ................ 370/331 |
| 2011/0249652 A1* | 10/2011 | Keller et al. .................. 370/331 |
| 2012/0327852 A1* | 12/2012 | Zisimopoulos et al. ...... 370/328 |

OTHER PUBLICATIONS

ETSI TS 101 285 V7.2.0, Dec. 2001. "Digital cellular telecommunications system (Phase 2+);Customised Applications for Mobile network Enhanced Logic (CAMEL); Service definition;Stage 1." Retrieved on Nov. 7, 2013 from <www.3GPP.org>.*

(Continued)

*Primary Examiner* — Dustin Nguyen
*Assistant Examiner* — Juan C Turriate Gastulo
(74) *Attorney, Agent, or Firm* — Knobbe, Martens, Olson & Bear, LLP

(57) ABSTRACT

A method and system for routing a voice connection over a cellular network to a mobile station is disclosed. The cellular network comprises a plurality of base stations, some of which have capability to provide the voice connection to the mobile station using Voice over Internet Protocol (VoIP). A voice connection for the mobile station is identified at an Application Server of the cellular network. A request message is sent from the Application Server to a Home Subscriber Server (HSS), or Home Location Register (HLR), of the cellular network. The request message requests an indication ds to whether the mobile station is being served by a base station having capability to provide a voice connection using VoIP.

23 Claims, 1 Drawing Sheet

(56) References Cited

OTHER PUBLICATIONS

3GPP TS 23.272, Sep. 2008. "3rd Generation Partnership Project-;Technical Specification Group Services and System Aspects; Circuit Switched Fallback in Evolved Packet System; Stage 2." Retrieved on Nov. 7, 2013 from <www.3GPP.org>.*

Ericsson, ST-Ericsson, Nov. 16-20, 2009. "Network based Solution to Improve T-ADS in the SCC AS" Retrieved on Nov. 6, 2013 from <www.3GPP.org>.*

3GPP TS 22.173 V10.0.0 (Sep. 2009), Technical Specification, 3rd Generation Partnership Project; Technical Specification Group Services and System Aspects; IP Multimedia Core Network Subsystem (IMS) Multimedia Telephony Service and supplementary services; Stage 1 (Release 10), 63 pp.

Ericsson et al: "Network-based solution to improve T-ADS in the SCC AS", 3GPP Draft; S2-096856 DISC T-ADS, 3$^{rd}$ Generation Partnership Project (3GPP), Mobile Competence Centre; 650, Route Des Lucioles; F-06921 Sophia Antipolis Cedex; France, No. Cabo; Nov. 2009, XP050397741.

Ericsson et al; "Support for PS voice indicator in SCC AS", 3GPP Draft; S2-097412_WAS_S2-097237_OPTION1_23292_REL8_R5, 3$^{rd}$ Generation Partnership Project (3GPP), Mobile Competence Centre:, 650, Route Des Lucioles; F-06921 Sophia-Antipolis Cedex; France, vol. SA WG2, No. Cabo; Nov. 21, 2009, XP050432483.

"3$^{rd}$ Generation Partnership Project; Technical Specification Group Core Network and Terminals; IP Multimedia (IM) Subsystem Sh interface; Signalling flows and message contents (Release 8)", 3GPP Standard; 3GPP TS 29.328, 3$^{rd}$ Generation Partnership Project (3GPP); Mobile Competence Centre; 650, Route Des Lucioles; F-06921 Sophia-Antipolis Cedex; France; No. V8.6.0, Sep. 1, 2009, pp. 1-42, XP050372905.

"3$^{rd}$ Generation Partnership Project; Technical Specification Group Services and System Aspects; IP Multimedia Subsystem (IMS) Centralized services; Stage 2 (Release 9)", 3GPP Standard; 3GPP TS 23.292, 3$^{rd}$ Generation Partnership Project (3GPP); Mobile Competence Centre; 650, Route Des Lucioles; F-06921 Sophia-Antipolis Cedex; France; No. V9.3.0, Sep. 1, 2009, pp. 1-106, XP050363566.

* cited by examiner

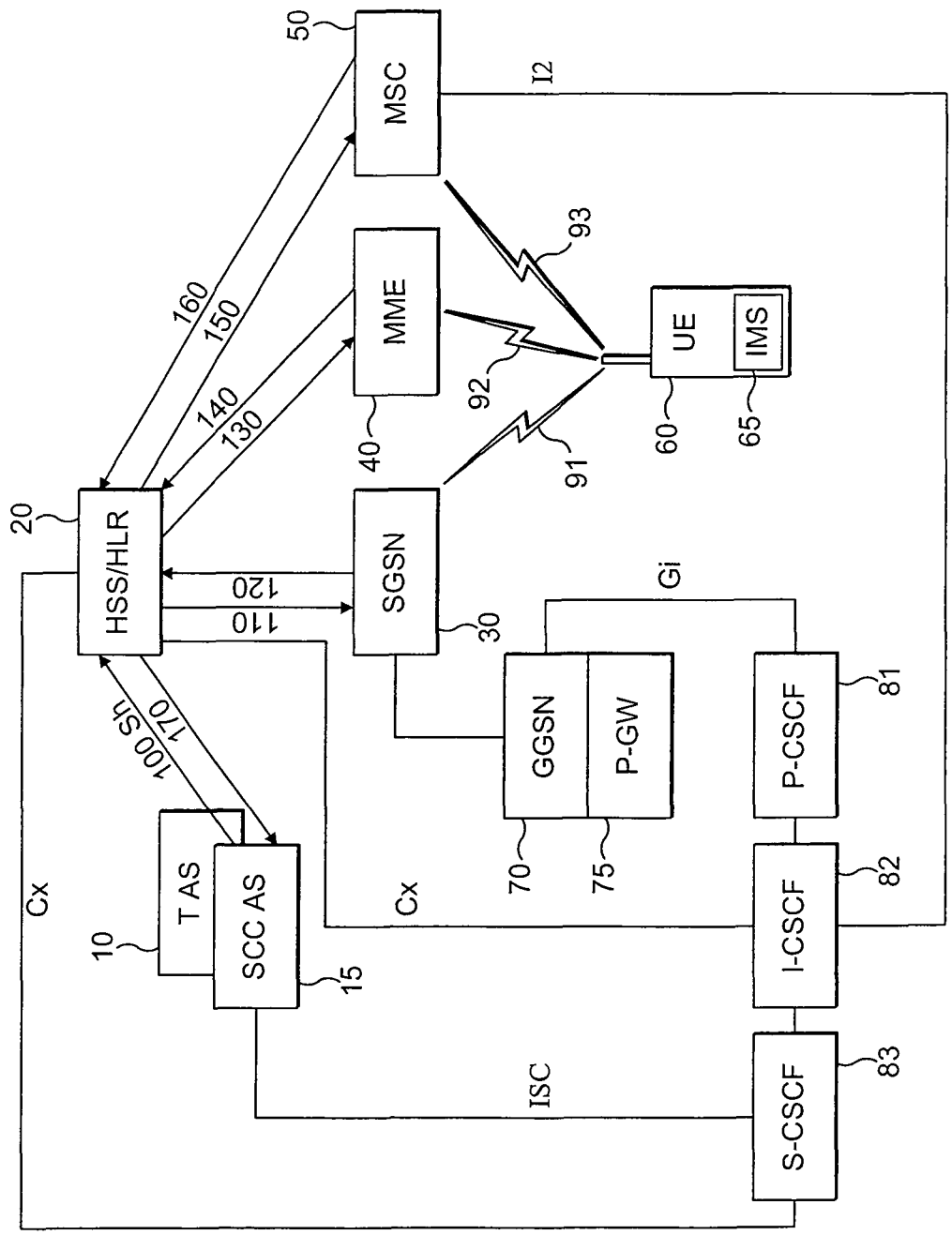

VOICE OVER INTERNET PROTOCOL PROVISION

TECHNICAL FIELD

This application is related to a method of routing a voice connection (call) over a cellular network to a mobile station. The cellular network may comprise a plurality of base stations, some of which have capability to provide the voice connection to the mobile station using Voice over Internet Protocol (VoIP).

BACKGROUND OF THE INVENTION

Users demand provision of voice connections over cellular networks. In existing GSM and UMTS networks, these can be provided using dedicated Circuit Switched (CS) technology over the Radio Access Network (RAN). The third generation partnership project (3GPP) has developed standards for a cellular communication system, referred to as long term evolution (LTE). LTE does not support CS technology. Instead, it is expected that an IP Multimedia Subsystem (IMS) will be used for voice connections in LTE using Voice over Internet Protocol (VoIP).

Mobile stations, which are usually termed user equipment (UE), can operate at any one time with one of the: GSM EDGE RAN (GERAN); the UMTS Terrestrial RAN (UTRAN); and the LTE Enhanced-UTRAN (E-UTRAN). A GSM/GPRS network is not typically able to provide the bandwidth, Quality of Service (QoS) and handover to provide a VoIP call using an IMS. Some UMTS systems and a typical LTE system can provide this service, however. Consequently, a UE can make voice connections using CS technology over GERAN or UTRAN systems or use VoIP over E-UTRAN and some UTRAN system.

The IMS in the core network of the cellular system cannot see the underlying network beneath the Internet Protocol (IP) layer. This has some advantages, but adds a difficulty when routing incoming voice calls or sessions to a UE. The RAN is invisible to the IMS, since when a UE changes RAN, its IP address remains the same. If the UE is being served by a RAN without VoIP capability, the voice call needs to be routed in some other way, for example via CS infrastructure. When the UE then moves to LTE, which does not support CS technology, the voice call should be re-routed over VoIP.

Existing mechanisms to route a mobile-terminating voice connection first try VoIP over IMS and then drop back to CS, if the VoIP call cannot be supported, for example due to a lack of bandwidth. However, this drop back method is problematic, in that it adds to call set-up delay for all incoming calls. Moreover in the worst case, a time-out is reached by the calling party waiting for a connection and the call fails. Also, if a UE moves between a RAN with VoIP capability and one without this capability, the call can be lost because of the time needed to re-route the call. It is therefore desirable to route voice connections in a more efficient way over both RANs that are VoIP-capable and RANs that are VoIP-incapable.

SUMMARY OF THE INVENTION

According to the system described herein, there is provided a method of routing a voice connection over a cellular network to a mobile station, the cellular network comprising a plurality of base stations, some of which having capability to provide the voice connection to the mobile station using Voice over Internet Protocol (VoIP), the method comprising: identifying a voice connection for the mobile station at an Application Server of the cellular network; and sending a request message from the Application Server to a Home Subscriber Server (HSS), or Home Location Register (HLR), of the cellular network, the request message requesting an indication as to whether the mobile station is being served by a base station having capability to provide a voice connection using VoIP.

By using the interface between the HSS/HLR and the Application Server to provide information about how to route the incoming voice call for a mobile station (or equivalently, a User Equipment, UE), the HSS/HLR provides an efficient resource for making a determination about whether the mobile station is served by a base station with VoIP capability.

The method may further comprise sending a response message to the request message from the HSS or HLR to the Application Server. In some cases, the response message indicates that the mobile station is being served by a base station having capability to provide a voice connection using VoIP. The method may further comprise routing the voice connection through an IP Multimedia Subsystem, IMS, to the base station serving the mobile station. If the response message indicates that the mobile station can make use of VoIP, this may be employed through the IMS core network.

Beneficially, the method further comprises determining at the HSS or HLR the registration of the mobile station with at least one of: a Serving GPRS Support Node (SGSN); and a Mobility Management Entity (MME); and a Mobile Switching Centre (MSC). These correspond with UTRAN Packet Switched, E-UTRAN (LTE) or GERAN (or UTRAN circuit switched) coverage respectively.

The HSS or HLR advantageously determines that the mobile station is registered with a packet switching entity, which may be either the SGSN or the MME. The mobile station may optionally be registered with more than one packet switching entity, that is with both of the SGSN and MME.

In some embodiments, the HSS or HLR determines that the mobile station is registered with an SGSN. Then, the method further comprises sending a coverage request message from the HSS or HLR to the SGSN, the coverage request message requesting an indication as to whether the mobile station is being served by a base station having capability to provide a voice connection using VoIP.

In such cases, the method may further comprise determining at the SGSN that the mobile station is being served by a base station having capability to provide a voice connection using VoIP. Then, the SGSN may send a response to the coverage request message to the HSS or HLR, indicating that the mobile station is being served by a base station having capability to provide a voice connection using VoIP. Optionally, the response to the coverage request message may further comprise a time since last contact message indicating the time since last radio contact between the SGSN and the mobile station. Advantageously, the SGSN may further send a paging message to the mobile station, the paging message indicating that the voice connection is to be made to the mobile station using VoIP. Optionally, the response by the mobile station to the coverage request message from the SGSN indicates that all of the base stations associated with the SGSN have capability to provide a voice connection using VoIP. The response to the coverage request message from the packet switching entity may comprise a time since last contact message indicating the time since last radio contact between the SGSN and the mobile station.

In other cases where the HSS or HLR determines that the mobile station is registered with an SGSN, the SGSN may determine that the mobile station is not being served by a base station having capability to provide a voice connection using VoIP. Additionally or alternatively, the SGSN may determine that the mobile station is no longer being served by a base station with which it is associated. In either or both cases, the method may further comprise sending a response to the coverage request message from the SGSN to the HSS or HLR, comprising a time since last contact message indicating the time since last radio contact between the SGSN and the mobile station. Optionally, the response to the coverage request message may consist of only the time since last contact message. This may indicate that the mobile station is not being served by a base station having capability to provide a voice connection using VoIP.

Alternatively, the HSS or HLR may determine that the mobile station is registered with a MME. In such cases, the method may further comprise determining at the MME that the mobile station is being served by a base station having capability to provide a voice connection using VoIP. Then, the MME may send a response to the coverage request message to the HSS or HLR, indicating that the mobile station is being served by a base station having capability to provide a voice connection using VoIP. Optionally, the response to the coverage request message may further comprise a time since last contact message indicating the time since last radio contact between the MME and the mobile station. Advantageously, the MME further may send a paging message to the mobile station, the paging message indicating that the voice connection is to be made to the mobile station using VoIP. Optionally, the response by the mobile station to the coverage request message from the MME indicates that all of the base stations associated with the MME have capability to provide a voice connection using VoIP. The response to the coverage request message from the packet switching entity may comprise a time since last contact message indicating the time since last radio contact between the SGSN and the mobile station.

In other cases where the HSS or HLR determines that the mobile station is registered with an MME, the MME may determine that the mobile station is not being served by a base station having capability to provide a voice connection using VoIP. Additionally or alternatively, the MME may determine that the mobile station is no longer being served by a base station with which it is associated. In either or both cases, the method may further comprise sending a response to the coverage request message from the MME to the HSS or HLR, comprising a time since last contact message indicating the time since last radio contact between the MME and the mobile station. Optionally, the response to the coverage request message may consist of only the time since last contact message. This may indicate that the mobile station is not being served by a base station having capability to provide a voice connection using VoIP.

In some cases it is determined that the mobile station is registered with at least one of an SGSN or an MME and the respective SGSN or MME indicates that all of the base stations associated with the respective SGSN or MME have capability to provide a voice connection using VoIP. Then, the method may further comprise: receiving the response to the coverage request message from the packet switching entity at the HSS or HLR; caching VoIP capability information at the HSS or HLR; in response to the received response from the SGSN or the MME, the cached VoIP capability information indicating that the mobile station is being served by a base station having capability to provide a voice connection using VoIP. When the HSS or HLR receives a further request message from the Application Server, the further request message requesting an indication as to whether the mobile station is being served by a base station having capability to provide a voice connection using VoIP, the HSS or HLR may send a response message to the request message to the Application Server, the response message indicating whether the mobile station is being served by a base station having capability to provide a voice connection using VoIP, based on the cached VoIP capability information. Optionally, the method may further comprise removing the cached VoIP capability information when the HSS or HLR receives an indication that the SGSN or MME address registered with the HSS or HLR is to be changed, an indication that an SGSN address is to be registered with the HSS or HLR where previously no address was registered or an indication that an MME address is to be registered with the HSS or HLR where previously no address was registered.

The method may further beneficially comprise: determining at the HSS or HLR that the mobile station is registered with the SGSN and with the MME; carrying out the above method in respect of the SGSN; and carrying out the above method in respect of the MME. The method in respect of the SGSN may optionally be carried out at the same time as the method in respect of the MME. Alternatively, the two methods can be carried out in series, with either the method in respect of the SGSN being carried out first or the method in respect of the MME being carried out first.

Advantageously, the method may further comprise determining whether the mobile station is being served by a base station associated with the SGSN or MME having capability to provide a voice connection using VoIP, using the time since last contact message. This determination can be carried out at the HSS or HLR or at the Application Server. Either the SGSN or MME are selected. This selection may be based on the time since last contact message.

As part of this process, the mobile station may inform the packet switching entity with which it is registered when it moves between VoIP-capable and VoIP-incapable coverage. Under existing standards, this is always carried out, regardless of whether Idle-mode Signalling Reduction (ISR) is enabled. Then, the mobile station would always tell the SGSN, MME or both when swapping between VoIP-capable and VoIP-incapable coverage.

Also, the HSS or HLR or Application Server may determine whether the SGSN or MME is currently serving the mobile station by analysing the received time since last radio contact messages from each of the SGSN and MME respectively. The time since last radio contact message that indicates the longer time since last radio contact may be discarded. The VoIP capability indication may be determined from the response message received indicating the shorter time since last radio contact and used to determine if the mobile station is in VoIP-capable coverage. Where the determination is made by the Application Server, the HSS or HLR sends the time since last radio contact for the SGSN and MME to the Application Server.

If both the SGSN and MME indicate that the mobile station is being served by a base station with VoIP-capability and with the same time since last radio contact, the HSS or HLR may select to inform the Application Server that a base station associated with either the SGSN or MME may be used for providing a voice connection using VoIP. Alternatively, this determination may be made by the Application Server.

The HSS or HLR may send a response message to the request message to the Application Server, the response message indicating whether the mobile station is being served by a base station having capability to provide a voice connection using VoIP. Additionally, the response message may indicate whether the base station is associated with the SGSN or MME.

In some embodiments, the HSS or HLR determines that the mobile station is registered with an MSC. Then, the method may further comprise: performing a MAP-Provide-Roaming-Number procedure between the HSS or HLR and MSC. The HSS or HLR may receive a Mobile Station Roaming Number, MSRN, from the MSC and communicates the MSRN to the Application Server. Then, the method may further comprise routing the voice connection through the MSC to the mobile station from the Application Server. In this case, the Application Server takes the role of a Gateway MSC (GMSC), as defined in 3GPP standards.

In some embodiments, the system described herein may provide a computer program operable to carry out the method described herein. Optionally, the computer program may be stored on a computer readable medium. Additionally or alternatively, the system described herein may be used in accordance with a processor configured to operate according to the computer program.

BRIEF DESCRIPTION OF THE DRAWING

Embodiments of the system described herein will now be explained by way of example only and with reference to the accompanying drawing in which:

FIG. 1 shows an illustration of a mobile network architecture, showing a flow of information in accordance with the an embodiment of the system described herein.

DETAILED DESCRIPTION OF VARIOUS EMBODIMENTS

Referring now to FIG. 1, there is shown an illustration of a mobile network architecture, showing a flow of information in accordance with an embodiment of the system described herein.

The mobile network architecture comprises: a user equipment (UE) 60; a serving GPRS support node (SGSN) 30; a mobility management entity (MME) 40; a mobile switching centre (MSC) 50; a home subscriber server (HSS) or home location register (HLR) 20; a telephony application server (T AS) 10; and a service centralisation and continuity application server (SCC AS) 15. The T AS 10 and SCC AS 15 form part of the IP multimedia subsystem (IMS) within the core network.

Other features shown in this drawing are: a gateway GPRS support node (GGSN) 70; a packet data network (PDN) gateway (P-GW) 75; a proxy-call session control function (P-CSCF) 81; an interrogating CSCF (I-CSCF) 82; a serving CSCF (S-CSCF) 83; and an IP multimedia subsystem (IMS) client 65 within the UE 60. Some of the interfaces between these entities are also shown in FIG. 1.

The UE 60 may be in communication with the SGSN 30 through first link 91, or with MME 40 through second link 92 or with MSC 50 through third link 93. When a voice call for the UE 60 is routed to SCC AS 15, the SCC AS 15 does not know whether the UE 60 is being served by a base station (or equivalently Node B or eNodeB). More significantly, the SCC AS 15 does not know whether the UE 60 is being served by a radio access network that is capable of providing VoIP services. It is desirable that the SCC AS 15 uses an IMS service, using IMS CLIENT 65 in the UE 60.

It is desirable that the UE 60 keeps the SGSN 30 or the MME 40 informed about whether the UE 60 is being served by a base station with VoIP-capability or not. In practice, the UE 60 may do this by keeping the SGSN 30 or MME 40 informed when it enters or leaves a VoIP-capable area.

The IMS (through SCC AS 15) interrogates entities elsewhere in the core network about provision of access to the destination UE 60. When the mobile terminating voice call arrives into the IMS, it is forwarded to a SCC AS 15. This application server determines whether the user has an IMS voice subscription, a circuit switched voice subscription or both and may also apply some local operator or user configured policy or both and determines if the destination user is able to receive incoming voice calls. For example, if any call barring or call forwarding or redirection is made active, the user may not be able to receive these. If the user is not able to receive incoming voice calls, the call is routed in the normal way, for example to an announcement generating entity, voicemail box, or a forwarded or redirected destination address. The T AS 10 is used to provide this functionality, before the call is routed to the SCC AS 15.

The T AS 10 is a Session Initiation Protocol (SIP) Application Server, providing network support for a multimedia telephony service. This is defined in 3GPP TS 22.173. It is noted in 3GPP standards that support of multimedia telephony services may be allocated to one or more Application Servers. The SCC AS 15 provides an anchor for calls, specifically voice and video calls, but also facsimile calls and data calls provided over circuit switched connections and IMS connections. This allows such calls to continue seamlessly between IMS and circuit switched provision as well as provide to provide IMS services to circuit switched calls, which may or may not have originally started on IMS.

If the user is able to receive incoming calls, then the SCC AS 15 determines whether there is a preference by the operator or the user to receive calls only through circuit switched technology. If so, the call is routed to circuit switched infrastructure, specifically MSC 50 and terminated accordingly through third link 93.

The operator may set a preference that the user will receive calls only through IMS or through IMS and circuit switched technology. In such cases, the following procedure can be followed.

In general, the SCC AS 15 sends a request to the HSS/HLR 20 asking whether or not the UE 60 is in VoIP-capable coverage. This is a request message 100 sent over the Sh interface. The HSS/HLR 20 sends a response message 170 to the SCC AS 15, indicating whether the UE 60 is in VoIP-capable coverage. If so, the SCC AS 15 routes the voice connection over IMS to the IMS client 65 in the UE 60. Otherwise, the call is routed via circuit switched infrastructure (specifically MSC 50) to the destination UE 60.

The HSS/HLR 20 upon receiving the request message 100 can determines if the UE 60 is registered on an SGSN 30, an MME 40 or both.

If the UE 60 is registered only on an SGSN 30, the following procedure is carried out. The HSS/HLR 20 sends a coverage request message 110 to the SGSN 30, asking whether or not the UE 60 is in VoIP or non-VoIP coverage. Optionally, this request carries an indication that this enquiry is a prelude to a mobile-terminating IMS session.

If the UE 60 is being served by a GERAN (not shown), or a UTRAN (not shown) that is non-VoIP capable, then the SGSN 30 sends a response message 120 to the HSS/HLR 20 that the UE 60 is not in VoIP capable coverage, and indicates the time since the last radio contact with the UE 60. In this case, the SGSN 30 does not use the message from the HSS/HLR 20 as a trigger to page the UE 60.

If the UE 60 is served by a UTRAN that has VoIP capable cells, then the SGSN 30 sends the response message 120 to the HSS/HLR 20, indicating that the UE 60 is in VoIP capable coverage and indicating the time since the last radio contact with the UE 60. The SGSN 30 may (for example, if the HSS/HLR 20 indicated that the enquiry was a prelude to an IMS session) then also page the UE 60 so that the UE 60 may be prepared to receive the incoming VoIP call from the network.

If the UE 60 is registered only on the MME 40, the following procedure is carried out. The HSS/HLR 20 sends a coverage request message 110 to the MME 40, asking whether or not the UE 60 is in VoIP or non-VoIP coverage. Optionally, this request carries an indication that this enquiry is a prelude to a mobile-terminating IMS session.

If the UE 60 is being served by an E-UTRAN (not shown) that is non-VoIP capable, then the MME 40 sends a response message 140 to the HSS/HLR 20 that the UE 60 is not in VoIP capable coverage, and indicates the time since the last radio contact with the UE 60. In this case, the MME 40 does not use the message from the HSS/HLR 20 as a trigger to page the UE 60.

If the UE 60 is served by a E-UTRAN that has VoIP capable cells, then the MME 40 sends the response message 140 to the HSS/HLR 20, indicating that the UE 60 is in VoIP capable coverage and indicating the time since the last radio contact with the UE 60. The MME 40 may (for example, if the HSS/HLR 20 indicated that the enquiry was a prelude to an IMS session) then also page the UE 60 so that the UE 60 may be prepared to receive the incoming VoIP call from the network.

If the UE 60 is registered on both an SGSN 30 and an MME 40, then the above procedure for the SGSN 30 (coverage request message 110 and response message 120) and the procedure for the MME 40 (coverage request message 130 and response message 140) are both executed, either in parallel or in series. Once the HSS/HLR 20 has received a response message 120 from the SGSN and a response message 140 from the MME (assuming that both MME 40 and SGSN 30 were contacted), the information on VoIP support/non-support is conveyed to the SCC AS 15, through response message 170. In some cases, the HSS/HLR 20 may not initially be able to determine whether the UE 60 is currently served by SGSN 30 or MME 40. Using the time since last radio contact information in the response message 120 or the response message 140, the HSS/HLR 20 can establish whether the UE 60 is served by a base station with VoIP capability. For instance, this can occur when differing responses are received from the SGSN 30 and MME 40, such as when one says the UE 60 has VoIP-capable coverage, whilst the other says that the coverage is VoIP-incapable. The HSS/HLR 20 determines which is the response that should prevail, and thus whether the UE is in VoIP coverage, from the time since last radio contact information.

Alternatively, the HSS/HLR 20 uses the "time since last radio contact with the UE" in response message 120 from the SGSN 30 or in response message 140 from the MME 40 or both to forward only VoIP support/non-support information on the most recently contacted MME/SGSN to the AS.

On GERAN and UTRAN, the VoIP indicator information supplied to the SGSN 30 is on a routing area basis and, for E-UTRAN, the VoIP indicator information supplied to the MME 40 is on a tracking area basis.

As an optional enhancement, the SGSN 30, MME 40 or both may also convey to the HSS/HLR 20, through the response message 120, if all of its connected cells are all VoIP capable or all of its connected cells are all VoIP incapable. This therefore enables caching on the HSS/HLR 20, as detailed below.

This caching procedure is effective when the UE 60 remains connected to the MME 40 or the SGSN 30 or both with all cells that are either VoIP capable or VoIP incapable. Then, the positive acknowledgement of the UE 60 being in VoIP capable or VoIP incapable coverage is cached by the HSS/HLR 20 for future use upon receiving further request messages 100 from the SCC AS 15. This cache may be cleared in the following cases: firstly, when the UE 60 has an address for MME 40 registered in the HSS/HLR 20 and then an address for a new MME is registered or the address in the register is otherwise cleared; and secondly, when the UE 60 has an address for SGSN 30 registered in the HSS/HLR 20 and then a new address for an SGSN is registered or the address in the register is otherwise cleared.

As an additional enhancement to the above procedure, the HSS/HLR 20 may determine if the UE 60 is registered on an MSC 50. If so, in parallel to the SGSN 30 or MME 40 enquiries or both, the HSS/HLR 20 performs a conventional MAP-Provide-Roaming-Number procedure to that MSC 50, involving first message 150. Reply message 160 from the MSC 50 to the HSS/HLR 20 returns the Mobile Station Roaming Number (MSRN) and the HSS/HLR 20 may pass this on to the SCC AS 15 through response message 170 in order for the SCC AS 15 (if the SCC AS 15 has Gateway MSC, GMSC, functionality) to route the call directly on to the MSC 50. Otherwise, in preparation for the circuit switched infrastructure, the SCC AS 15 can route the call to the UE via a separate GMSC. The HSS/HLR 20 can perform the MAP-Provide-Roaming-Number procedure either upon reception of the request message 100 from the SCC AS 15, or upon receiving the response message 140 from the MME 50 or the response message 120 from the SGSN 30 or both, stating that the UE 60 is not in any VoIP capable coverage at all (that is, neither on the MME 40 nor on the SGSN 30).

The skilled person will be aware that various modifications to the above-identified embodiments can be made. For example, if other VoIP-capable networks become available, an approach according to the system described herein may be implemented in order to inform the SCC AS 15 that the UE 60 has VoIP capable coverage on this other network. Although an SCC AS has been used for receiving and forwarding voice calls within the core network, the skilled person will understand that any other type of Application Server may be used, including T AS 10.

The Application Server can send request message 100 over a MAP based interface, rather than an Sh interface.

Also, the system described herein is not limited to provision of voice calls over IMS as the call control protocol. Other VoIP systems can be employed, such as SIP or proprietary protocols. In this case, the network operator may allow the VoIP service provider access to the required nodes, such as the HSS/HLR 20 through an agreement. Also, the skilled person will understand that the SCC AS, TAS, S-CSCF, I-CSCF and P-CSCF entities can be replaced in such embodiments by different nodes, since these entities relate to an implementation based on IMS.

Although the SGSN 30, MME 40 or both may provide a time since last radio contact with the UE 60, this is not required in all circumstances, although is normally mandated by the requirements of standards. For example, other similar information could be provided instead. The use of the time since last radio contact message allows the UE 60 to roam on the SGSN 30 and the MME 40 at the same time, without impacting on the ability to inform the SCC AS 15 of the VoIP capability of the base station serving the UE 60.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of routing a voice connection over a cellular network to a mobile station, the cellular network comprising a plurality of base stations, some of the plurality of base stations having capability to provide the voice connection to the mobile station using Voice over Internet Protocol (VoIP), the method comprising:
   identifying an incoming voice connection for the mobile station at an Application Server of the cellular network;
   sending a request message from the Application Server to a register circuit of the cellular network, the request message requesting an indication as to whether or not the mobile station is being served by a base station having capability to provide the incoming voice connection to the mobile station using VoIP;
   determining, by the register circuit, the mobile station is registered with a packet switching entity;
   in response to identifying the incoming voice connection and receiving the request message from the Application Server by the register circuit, sending a coverage request message from the register circuit to the packet switching entity before routing the incoming voice connection to the mobile device, the coverage request message requesting the indication as to whether or not the mobile station is being served by a base station having capability to provide the incoming voice connection to the mobile station using VoIP;
   receiving, at the register circuit, a response to the coverage request message from the packet switching entity that indicates whether or not the mobile station is being served by a base station having capability to provide the incoming voice connection to the mobile station using VoIP; and
   sending a response message from the register circuit to the Application Server based on the register circuit receiving the response to the coverage request message from the packet switching entity, wherein, if the coverage request message indicates the mobile station is being served by a base station having capability to provide the incoming voice connection to the mobile station using VoIP, routing of the incoming voice connection using VoIP towards the base station serving the mobile station.

2. The method of claim 1, wherein the incoming voice connection is routed through an IP Multimedia Subsystem (IMS) to the base station serving the mobile station.

3. The method of claim 1, further comprising:
   determining at the packet switching entity that the mobile station is being served by a base station having capability to provide the incoming voice connection to the mobile station using VoIP; and
   sending the response to the coverage request message from the packet switching entity to the register circuit, the response indicating that the mobile station is being served by a base station having capability to provide the incoming voice connection to the mobile station using VoIP.

4. The method of claim 3, wherein the response to the coverage request message from the packet switching entity indicates that all of the base stations associated with the packet switching entity have capability to provide the incoming voice connection to the mobile station using VoIP.

5. The method of claim 1, further comprising:
   sending a paging message from the packet switching entity to the mobile station, the paging message indicating that the incoming voice connection is to be made to the mobile station using VoIP.

6. The method of claim 1, wherein, where a determination is made that the mobile station is not being served by a base station having capability to provide the incoming voice connection to the mobile station using VoIP, the response message includes last contact information comprising a last radio contact with the mobile station, and wherein the last contact information comprises a time since last radio contact between the packet switching entity and the mobile station.

7. The method of claim 6, farther comprising:
   determining at the packet switching entity that the mobile station is not being served by a base station having capability to provide the incoming voice connection to the mobile station using VoIP; and
   sending the response to the coverage request message from the packet switching entity to the register circuit, the response comprising the time since last radio contact between the packet switching entity and the mobile station.

8. The method of claim 1, wherein the packet switching entity includes a Serving GPRS Support Node (SGSN) and a Mobility Management Entity (MME), the method further comprising:
   sending the coverage request message from the register circuit to the MME;
   sending the response to the coverage request message from the MME to register circuit, the response comprising a time since last contact message indicating the time since last radio contact between the MME and the mobile station;
   determining whether the mobile station is being served by a base station having capability to provide the voice connection to the mobile station using VoIP, based on the time since last contact message received in respect of the SGSN and the time since last contact message received in respect of the MME; and sending the response message to the request message from the register circuit to the Application Server, the response message indicating whether or not the mobile station is being served by a base station having capability to provide the incoming voice connection to the mobile station using VoIP.

9. The method of claim 1, further comprising:
receiving the response to the coverage request message from the packet switching entity at the register circuit;
caching VoIP capability information at the register circuit, in response to the received response, the cached VoIP capability information indicating whether or not the mobile station is being served by a base station having capability to provide the incoming voice connection to the mobile station using VoIP;
receiving a further request message from the Application Server at the register circuit, the further request message requesting an indication as to whether or not the mobile station is being served by a base station having capability to provide the incoming voice connection to the mobile station using VoIP; and
sending the response message to the request message from the register circuit to the Application Server, the response message indicating whether or not the mobile station is being served by a base station having capability to provide the incoming voice connection to the mobile station using VoIP based on the cached VoIP capability information.

10. The method of claim 9, further comprising:
removing the cached VoIP capability information when the register circuit receives an indication that the address registered with the register circuit for the packet switching entity is to be changed or cleared.

11. The method of claim 1, wherein the register circuit determines that the mobile station is registered with a Mobile Switching Centre (MSC), the method further comprising:
performing a MAP-Provide-Roaming-Number procedure between the HSS or register circuit and the MSC;
receiving a Mobile Station Roaming Number (MSRN) from the MSC at the register circuit and communicating the MSRN to the Application Server; and
routing the incoming voice connection through the MSC to the mobile station.

12. A system of routing a voice connection over a cellular network to a mobile station, the cellular network comprising a plurality of base stations, some of which having capability to provide the voice connection to the mobile station using Voice over Internet Protocol (VoIP), the system comprising:
an Application Server of the cellular network, the Application Server including at least one processor configured to identify an incoming voice connection for the mobile station;
a register circuit of the cellular network, the Application Server further configured to send a request message to the register circuit requesting an indication as to whether or not the mobile station is being served by a base station having capability to provide the incoming voice connection to the mobile station using VoIP; and
a packet switching entity;
wherein the register circuit is configured to:
determine registration of the mobile station with the packet switching entity,
in response to identifying the incoming voice connection and receiving the request message from the Application Server by the register circuit, send a coverage request message to the packet switching entity before routing the incoming voice connection to the mobile device, the coverage request message requesting the indication as to whether or not the mobile station is being served by a base station having capability to provide the incoming voice connection to the mobile station using VoIP,
receive, at the register circuit, a response to the coverage request message from the packet switching entity that indicates whether or not the mobile station is being served by a base station having capability to provide the incoming voice connection to the mobile station using VoIP; and
send a response message from the register circuit to the Application Server based on the register circuit receiving the response to the coverage request message from the packet switching entity, wherein, if the coverage request message indicates the mobile station is being served by a base station having capability to provide the incoming voice connection to the mobile station using VoIP, routing of the incoming voice connection using VoIP towards the base station serving the mobile station.

13. A non-transitory computer readable medium storing computer software for routing a voice connection over a cellular network to a mobile station, the cellular network comprising a plurality of base stations, some of the plurality of base stations having capability to provide the voice connection to the mobile station using Voice over Internet Protocol (VoIP), the computer software comprising:
executable code that identifies an incoming voice connection for the mobile station at an Application Server of the cellular network;
executable code that sends a request message from the Application Server to a register circuit of the cellular network, the request message requesting an indication as to whether or not the mobile station is being served by a base station having capability to provide the incoming voice connection to the mobile station using VoIP;
executable code that determines, at the register circuit, registration of the mobile station with a packet switching entity;
executable code that, in response to identifying the incoming voice connection and receiving the request message from the Application Server by the register circuit, sends a coverage request message from the register circuit to the packet switching entity before routing the incoming voice connection to the mobile device, the coverage request message requesting the indication as to whether or not the mobile station is being served by a base station having capability to provide the incoming voice connection to the mobile station using VoIP;
executable code that receives, at the register circuit, a response to the coverage request message from the packet switching entity that indicates whether or not the mobile station is being served by a base station having capability to provide the incoming voice connection to the mobile station using VoIP; and
executable code that sends a response message from the register circuit to the Application Server based on the reception of the response to the coverage request message from the packet switching entity at the register circuit, wherein, if the coverage request message indicates the mobile station is being served by a base station having capability to provide the incoming voice connection to the mobile station using VoIP routing of the incoming voice connection using VoIP towards the base station serving the mobile station.

14. The non-transitory computer readable medium of claim 13, wherein the incoming voice connection is routed through an IP Multimedia Subsystem (IMS) to the base station serving the mobile station.

15. The non-transitory computer readable medium of claim 13, wherein the computer software further comprises:
executable code that determines at the packet switching entity that the mobile station is being served by a base station having capability to provide the incoming voice connection to the mobile station using VoIP; and
executable code that sends the response to the coverage request message from the packet switching entity to the register circuit, indicating that the mobile station is being served by a base station having capability to provide the incoming voice connection to the mobile station using VoIP.

16. The non-transitory computer readable medium of claim 13, wherein the register circuit determines that the mobile station is registered with a Mobile Switching Centre (MSC), wherein the computer software further comprises:
executable code that performs a MAP-Provide-Roaming-Number procedure between the register circuit and MSC;
executable code that receives a Mobile Station Roaming Number (MSRN) from the MSC at the register circuit and communicating the MSRN to the Application Server; and
executable code that routes the incoming voice connection through the MSC to the mobile station.

17. The system claim 12, wherein, where a determination is made that the mobile station is not being served by a base station having capability to provide the incoming voice connection to the mobile station using VoIP, the response message includes last contact information comprising a last radio contact with the mobile station, and wherein the last contact information includes a time since last radio contact between the packet switching entity and the mobile station.

18. The system of claim 17, wherein the packet switching entity determines that the mobile station is not being served by a base station having capability to provide the voice connection to the mobile station using VoIP, and wherein the response to the coverage request message sent from the packet switching entity to the register circuit comprises the time since last radio contact between the packet switching entity and the mobile station.

19. The non-transitory computer readable medium of claim 13, wherein, where a determination is made that the mobile station is not being served by a base station having capability to provide the incoming voice connection to the mobile station using VoIP, the response message includes last contact information comprising a last radio contact with the mobile station, and wherein the last contact information comprises a time since last radio contact between the packet switching entity and the mobile station.

20. The non-transitory computer readable medium of claim 19, wherein the computer software further comprises:
executable code that determines at the packet switching entity that the mobile station is not being served by a base station having capability to provide the incoming voice connection to the mobile station using VoIP; and
executable code that sends the response to the coverage request message from the packet switching entity to the register circuit, the response comprising the time since last radio contact between the packet switching entity and the mobile station.

21. The method of claim 1, wherein the coverage request message indicates that the coverage request message is a prelude to the incoming voice connection being routed through an IP Multimedia Subsystem (IMS) of the base station.

22. The system of claim 12, wherein the coverage request message indicates that the coverage request message is a prelude to the incoming voice connection being routed through an IP Multimedia Subsystem (IMS) of the base station.

23. The non-transitory computer readable medium of claim 13, wherein the coverage request message indicates that the coverage request message is a prelude to the incoming voice connection being routed through an IP Multimedia Subsystem (IMS) of the base station.

* * * * *